July 10, 1928.  
H. SCUTERUD  
1,676,749  
AUTOMOBILE BUMPER  
Filed Dec. 26, 1927
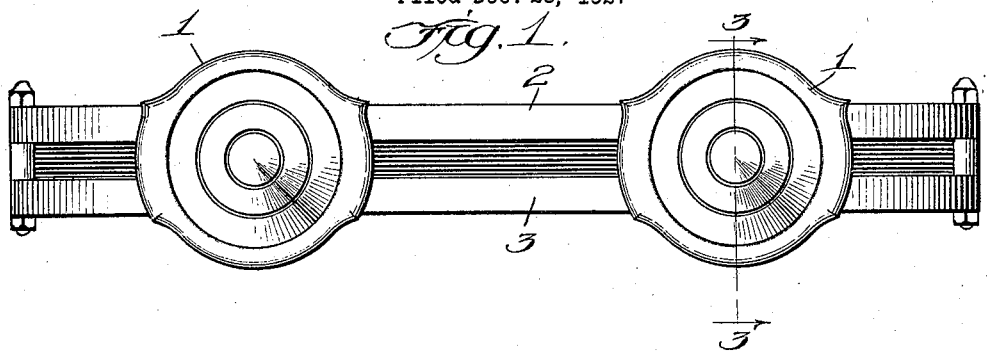
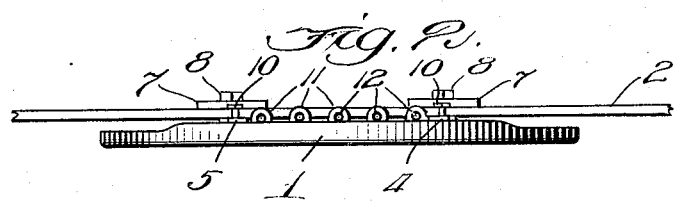
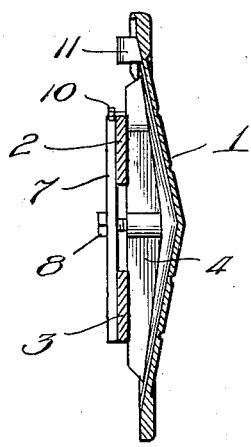
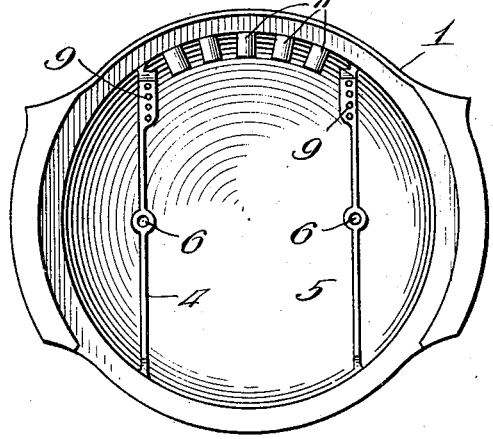
Inventor:  
Harold Scuterud,  
by Wm. F. Freudenreich  
Atty Patented July 10, 1928.

1,676,749

UNITED STATES PATENT OFFICE.

HAROLD SCUTERUD, OF CHICAGO, ILLINOIS.

AUTOMOBILE BUMPER.

Application filed December 26, 1927. Serial No. 242,535.

The present invention has for its object to produce a simple and novel attachment for an automobile that will more effectively protect the same upon collision than do the usual devices for that purpose.

In carrying out my invention I employ a stiff plate of considerable size, the outer face of which is preferably in the form of a flat cone; two of such plates being fastened to the front or rear of an automobile or to both the front and rear, either directly to the frame or to any usual bumper. These plates may be of attractive design and be highly polished. Therefore, viewed in one of its aspects, the present invention may be said to have for its object to produce a novel and efficient automobile bumper that will be ornamental as well.

If desired, the plates may be provided with sockets into which flag staffs or supporting stems for other ornamental devices may be set. Therefore viewed in another of its aspects, the present invention may be said to have for its object to produce a simple, novel and efficient bumper element that will serve also as a support for flags, ornaments or other devices.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a front view of a fragment of an automobile having my improvement attached thereto; Fig. 2 is a top plan view, on a larger scale; Fig. 3 is a section on the same scale as Fig. 2, on line 3—3 of Fig. 1; and Fig. 4 is a rear view of one of the bumper plates.

Referring to the drawing, 1 represents a stiff, heavy, shield-like metal plate of considerable size of dish shape and provided with means for securing it to an automobile with the convex side facing outwardly. The convex side of the plate, particularly the central portion, is preferably in the form of a flat cone. Two of these plates may be placed at the front end of an automobile, near the sides, and two others, if desired, at the back.

The plates may be mounted in any one of a variety of ways. In the drawings I have illustrated, and for the sake of brevity I shall describe, only a single satisfactory mounting; namely on a common form of resilient bumper comprising two parallel horizontal strips or bars 2 and 3. In the concavity of the bumper plate or shield are arranged parallel ribs 4 and 5, preferably cast integral with the shield. These ribs are placed far enough apart to permit one of the fastenings for the elements 2 and 3 to lie between the same. At the middle of each rib is a screw-threaded hole 6. Two of the plates or shields are placed against the front of the elements 2 and 3, preferably over the fastening means for the latter, with the convex faces directly outwardly and the ribs bearing against said elements. Two short perforated bars 7, 7 are placed in rear of the bumper elements 2 and 3 directly opposite the ribs on each of the two plates or shields. Screws 8 are then passed through these bars and into the holes 6, the screws extending through the space between the members 2 and 3. In order that the weight of the plates or shields need not be borne entirely by the screws 8, each of the ribs may have therein at one end a series of screw-threaded holes 9 distributed lengthwise of the rib. A small screw 10 may be placed in that hole in each rib lying directly above the upper bumper element 2, so that each plate or shield will be hung from the upper edge of the upper bumper element by means of the two screws in the upper ends of the ribs.

That part of each plate or shield that is to form the top may be thickened on the rear side, conveniently by forming a number of bosses 11 distributed along the upper margin on the rear side. Each boss has a socket 12 opening out of the top of the same, the sockets preferably being arranged radially, so that a group of flags may be supported in a fan-shaped arrangement by inserting their staffs in these sockets. Of course other ornaments or other articles may similarly be supported in the sockets, if desired.

The convex faces of the plates or shields are preferably made smooth so that obstacles engaged thereby will slide along the same readily, being deflected laterally by the conical configuration of the plates or shields. The smoothness of the devices will be increased, and at the same time they will become highly ornamental in appearance, if their outer faces are plated with nickel or chromium.

It will be seen that regardless of the manner in which my improved devices are mounted, whether on bumpers or directly on an automobile frame, they will serve very effectively to protect the automobile from injury in case of collision and at the same time will make an automobile more attractive in appearance.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with an automobile, of two large stiff vertical bumper plates secured thereto and lying beyond an end thereof on opposite sides of the longitudinal center line of the automobile, each plate being in the form of a shield the major portion of which consists of a flat cone having its apex at the front.

2. An automobile bumper element comprising a large stiff shield-like plate thickened along the top and having outwardly opening radial sockets in the thickened portion to receive flag staffs or the like.

3. An automobile element in the form of a stiff dished plate having parallel ribs in the concavity, said ribs containing holes to receive fastening means.

4. An automobile element in the form of a stiff dished plate having parallel ribs in the concavity, said ribs containing holes to receive fastening means, and there being a series of bosses in the concavity near one edge and between the ribs, said bosses having sockets opening out of the periphery of the plate.

In testimony whereof, I sign this specification.

HAROLD SCUTERUD.